Patented Nov. 17, 1942

2,302,612

UNITED STATES PATENT OFFICE 2,302,612

PREPARATION OF COPPER PHTHALO-CYANINES

Harold Talbot Lacey, Plainfield, N. J., assignor, by mesne assignments, to American Cyanamid Company, New York, N. Y., a corporation of Maine No Drawing. Application October 13, 1939, Serial No. 299,262

6 Claims. (Cl. 260—314)

This invention relates to an improved process of producing pigments of the copper phthalocyanine series. Many processes have been devised for the production of phthalocyanine pigments, particularly copper phthalocyanine pigments, among the best known being processes in which o-dinitriles have been reacted with various cupriferous compounds or with metallic copper itself. In the practical processes only two classes of copper containing compounds have been used, namely metallic copper itself and copper halides.

The reaction of copper or copper halides with aromatic o-dinitriles is highly exothermic and while the process can be carried out theoretically in the absence of diluents, practically this is not feasible because the product of the reaction is a solid and the highly exothermic process is not readily controlled. It is possible to dispense with a diluent or solvent when elaborate equipment is employed to avoid the difficulties encountered in stirring the reaction mixture as it solidifies. Solid diluents such as salts have also been employed.

The most practical processes developed hitherto use a diluent or solvent among which are heterocyclic bases, notably of the pyridine series. Various improved processes employing such diluents are described in the co-pending applications of Lecher et al., Ser. Nos. 264,994, 287,272 and 287,273.

However, the reactions involving o-dinitriles and copper halides have presented a practical economic problem, because if an unhalogenated pigment is desired it is only possible to utilize a portion of the copper halide usually only one-half, and if all of the copper is to be used, the pigment resulting is halogenated. The standard reaction according to the prior art is illustrated by the production of copper phthalocyanine formed by reacting phthalonitrile and cuprous chloride at temperatures under 180° C. and proceeds as follows:

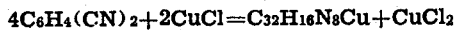

$4C_6H_4(CN)_2 + 2CuCl = C_{32}H_{16}N_8Cu + CuCl_2$

It will be noted that 100% excess of cuprous chloride is used over that necessary to supply the amount of copper actually entering into the pigment molecule. The second molecule of cuprous chloride performs the function of chlorine acceptor. At higher temperatures the cupric chloride formed also reacts and in this case the pigment itself acts as the chlorine acceptor and chlorinated pigments are produced. In fact, in the past it has not been possible to produce an unchlorinated pigment using cupric chloride as the only cupriferous agent. In the Lecher et al. application Ser. No. 287,273, an improvement is described in which metallic copper is added to reconvert a part of the cupric chloride to cuprous chloride, but even in this method all the copper is not used because some copper must remain in the form of cupric chloride, otherwise the reaction will not proceed.

According to the present invention cupric halides such as cupric chloride and bromide are used reacting with aromatic o-dinitriles such as phthalonitrile but an unhalogenated pigment is produced. This is made possible according to the present invention by carrying out the reaction of the o-dinitrile and cupric halide in the presence of an inert diluent and anhydrous or substantially anhydrous ammonia. The ammonia plays a part in the reaction which has not been definitely determined as yet, the most reasonable explanation appears to be that the ammonia acts primarily as a halogen acceptor forming nitrogen and ammonium halide, but other explanations are theoretically possible and the present invention is not limited to any particular theory of action.

It should be noted that ammonia has been used in the past in the production of phthalocyanine pigments but in every case the ammonia has been used to perform a different function and in a different reaction mixture. Thus, for example, if an anhydride, amide, or imide of o-dicarboxylic acid is used in place of an aromatic o-dinitrile, various processes have been used which employ ammonia in the reaction to furnish the nitrogen necessary for the formation of the pigment or to push the equilibrium to the side of the dinitrile. These processes give poor yields and have not achieved practical importance, and in these processes the ammonia behaves in a different manner.

It has also been proposed to produce metal free phthalocyanine pigments by heating the o-dinitrile in the presence of ammonia at very high temperatures such as 250° C. Here, however, there is no cupric halide present and it also appears well settled that the formation of the metal free pigment is not a step in the process of the present invention. That the reaction of the present invention is not similar to that which takes place by reacting at high temperature with ammonia to produce a metal free pigment is further borne out by the fact that copper halide and ammonia together permit a reaction to take place at a much lower temperature than when either of the two compounds are used alone and the result, an unhalogenated pigment, is different from that which is obtained when copper halide is used at a higher temperature.

The cupric chloride or cupric bromide or mixtures of both, should preferably be anhydrous which is also true of the ammonia, and essentially anhydrous conditions should be maintained throughout the reaction in order to insure the best yields. The introduction of the ammonia may be by gradual adding of the ammonia to the reaction mixture or the reaction can be carried out in the presence of an atmosphere of ammonia in an autoclave. Both procedures give good results and the one chosen is the one determined by economic conditions.

The process of the present invention does not require a critical control of temperature, the best results are obtained around 200° C., for example 180°–220° C., but the reaction also proceeds at lower temperatures down to 100° C. and higher temperatures up to 300° C., but the results are not as good as those obtained around 200° C.

The present invention is not limited to the use of any particular inert or substantially inert organic solvent or diluent. This is an advantage because the diluent can be chosen to fit economic conditions and it is not necessary to use the more expensive diluents or solvents, such as heterocyclic bases although they can be effectively employed in the present invention which is in no way limited to any particular solvent or diluent. Because of the above advantage I prefer to use the cheap organic diluents among which nitrobenzene is very useful because it is not only cheap, but its boiling point corresponds closely to the preferred temperature of reaction and it can therefore be used effectively as an internal thermostat by causing it to boil gently. Other organic solvents such as di- or trichlorbenzene may be employed and it is an advantage of the present invention that the solvents are easily recovered because when the reaction is over the pigment formed is filtered off and washed with the solvent used. The solvent is then recovered from the mother liquor by stripping it off with steam, or by any other suitable method.

The present invention is applicable to the production of copper compounds of the phthalocyanine type from aromatic o-dinitriles generally in which the nitriles may be carbocyclic or heterocyclic. As examples of such nitriles, there may be mentioned phthalonitrile, 3,4-dimethylphthalonitrile, 4-phenyl-phthalonitrile, 4-chlorophthalonitrile, 4,5-dichloro-phthalonitrile, 3-nitrophthalonitrile, 4-ethoxyphthalonitrile, 4-acetamino-phthalonitrile, 3,4-dicyanobenzophenone, 2,3-dicyanofluorenone, 2,3-dicyanopyrazine, 2,3-dicyanodiphenylene oxide, 1,2-dicyanonaphthalene, 6-methyl-2,3-dicyano-quinoxaline, 3,4-dicyano diphenyl.

While good results are obtained with cupric halides and ammonia alone, I have found that small amounts of the corresponding imide had a beneficial effect in thinning the charges and thus facilitating stirring. This permits using less diluent and increases the efficiency. The amount of imide is not large and in the production of copper phthalocyanine it is sufficient to use crude phthalonitrile which contains small amounts of phthalimide.

I have also found that small amounts of ammonium chloride appear to increase the yield particularly when small amounts of moisture are present. The reason for this result has not at present been determined and no theory of action is advanced. The invention is of course not limited broadly to the presence of small amounts of imides or ammonium chloride or both, but in the more specific aspects, these additions are features of the invention.

In general, the yields obtained by the process of the present invention are excellent and approach theoretical even when the material has been purified, that is to say by dissolving the pigment obtained in sulfuric acid and precipitating it with water or some other analogous purification method.

The present invention will be seen to possess numerous advantages over prior processes, or from another point of view to combine in a single process advantages which are obtained only singly in processes of the prior art. Among the advantageous results are excellent temperature control, sufficient fluidity to permit proper stirring, freedom from the production of chlorinated pigments, practically quantitative use of all of the copper entering into the reaction mixture and the possibility of using cheap solvents instead of expensive ones such as the pyridine bases or glycols. This last advantage is obtained only in more specific aspects of the present invention where the preferred cheap solvent or diluents are employed.

The invention is described in greater detail in conjunction with specific examples which are merely illustrative and are not in any way intended to limit the scope of the present invention to the details herein set forth. The parts in the examples are all by weight.

Example #1

37.5 parts anhydrous cupric chloride and 128 parts phthalonitrile are put into 1200 parts of nitrobenzene. This mixture is saturated with ammonia gas at room temperature. It is then slowly heated to its boiling point and refluxed for four hours while being stirred and kept saturated with ammonia. The pigment formation starts at 150–160° C. The pigment formed is filtered off, washed with nitrobenzene, methyl alcohol, warm dilute sulfuric acid and water and dried. It is purified by dissolving in concentrated sulfuric acid and precipitating in water. Copper phthalocyanine free from chlorine is obtained in very good yield.

If in the above experiment the ammonia is omitted, then a pigment formation starts only above 200° C. and is rather sluggish. In the same period of time only about one half the yield of pigment is obtained which, however, is not copper phthalocyanine but its monochloro derivative as indicated also by the continuous evolution of HCl gas during the reaction.

Example #2

1024 parts phthalonitrile, 102 parts phthalimide and 300 parts anhydrous cupric chloride are slurried in 4800 parts of nitrobenzene. The mixture is heated to 100–105° C. when the air in the vessel is replaced by ammonia gas and the mixture saturated with ammonia while being stirred. The reaction mixture is then further heated (while being stirred and being kept saturated with ammonia) to the boiling point and maintained at this temperature for four hours. The pigment formation starts at about 110°. The pigment is filtered, washed with nitrobenzene, methyl alcohol, aqueous ammonia and warm water. It is dried and purified by dissolving in concentrated sulfuric acid and precipitating in water. Copper phthalocyanine, being free from chlorine, is obtained in excellent yield.

Instead of starting from a mixture of pure phthalonitrile and pure phthalimide, crude phthalonitrile containing some phthalimide as obtained by catalytic condensation of phthalic anhydride and ammonia in the gaseous phase may be employed with equal success.

The nitrobenzene employed may be recovered from the filtrate by steam distillation.

Note that in this experiment the concentration is considerably higher and the nitrobenzene usage considerably lower than in Example 1 which is possible because the phthalimide being present has a thinning effect on the charge.

Example #3

1645 parts of crude phthalonitrile (containing 99 parts phthalimide and 8 parts of water) 200 parts ammonium chloride and 460 parts anhydrous cupric chloride are slurried in 4800 parts of nitrobenzene. The charge is heated to 100–110° C. and then the air is replaced by ammonia and the reaction mixture is saturated with ammonia while being stirred. The mixture is then heated to the boiling point while stirring is continued and an atmosphere of ammonia is maintained and the mixture is kept at the boiling point for 5 hours. The pigment formation starts at a temperature of 110–120° C.

The reaction product is recovered in the same way as in Example 2 and is obtained in practically theoretical yield.

In the above given example there may be substituted for nitrobenzene as diluent 1,2,4 trichlorobenzene or 1,2 dichlorobenzine and also in these cases the pigment is obtained in very good yield.

Example #4

256 parts phthalonitrile and 125 anhydrous cupric bromide are put into 3600 parts of nitrobenzene and the mixture is saturated with ammonia gas at room temperature while being stirred. It is then heated to the boiling point and maintained at the boiling temperature for three hours. The reaction mixture is worked up as in Example 2 and copper phthalocyanine free from bromine is obtained.

If in this case the ammonia is omitted, only a very poor yield on a pigment containing bromine is obtained and during the reaction hydrogen bromide is evolved.

Example #5

178 parts 1,2 dicyano naphthalene and 37.5 parts anhydrous cupric chloride are put into 1200 parts of nitrobenzene. The mixture is heated to about 100–110° C. and saturated with ammonia gas at this temperature while being stirred. It is then heated to the boiling point while an atmosphere of ammonia and good stirring is maintained. It is kept at this temperature for six hours. The reaction mixture is worked up as described in Example 2 and copper naphthalocyanine is obtained in good yield.

Example #6

194 parts of 6-methyl-2,3-dicyano quinoxaline (the preparation of which is described in Example 3 and Example 4 of our co-pending applications Ser. Nos. 287,272 and 287,273 respectively) and 37.5 parts anhydrous copper chloride are put into 1200 parts of nitrobenzene. The mixture is slowly heated to the boiling point while an atmosphere of ammonia gas is maintained and the mixture is stirred. It is kept at the boiling point for 6 hours. The reaction mixture is worked up as in Example 2 and a dark olive green pigment is obtained.

What I claim is:

1. A method of producing a chlorine free pigment of the copper phthalocyanine type which comprises reacting phthalonitrile with cupric chloride at a reaction temperature which would normally produce a chlorinated pigment, in the presence of a substantially inert organic diluent liquid at the reaction temperature, the reaction being carried out in the presence of sufficient substantially anhydrous ammonia to combine with all chlorine which may be set free in the reaction and to produce an unchlorinated copper phthalocyanine pigment.

2. A method of producing a chlorine free pigment of the copper phthalocyanine type which comprises reacting at about 180–220° C. an aromatic o-dinitrile with cupric chloride in the presence of a substantially inert organic diluent liquid at the reaction temperature in the presence of sufficient substantially anhydrous ammonia to combine with any chlorine which may be set free in the reaction, and to produce a chlorine free pigment.

3. A method of producing a chlorine free pigment of the copper phthalocyanine type which comprises reacting at about 180–220° C. phthalonitrile with cupric chloride in the presence of a substantially inert aromatic diluent liquid at the reaction temperature, the reaction being carried out in the presence of sufficient substantially anhydrous ammonia to combine with all chlorine which may be set free in the reaction and to produce a chlorine free copper phthalocyanine pigment.

4. A method of producing a halogen free pigment of the copper phthalocyanine type which comprises reacting an aromatic o-dinitrile with a cupric halide belonging to the group consisting of chloride and bromide, at a reaction temperature at which normally a halogenated copper phthalocyanine pigment would be produced, the reaction taking place in the presence of a substantially inert aromatic diluent liquid at the reaction temperature and of sufficient substantially anhydrous ammonia to combine with all the halogen which may be set free in the reaction and to produce an unhalogenated pigment.

5. A method according to claim 4 in which the diluent is nitrobenzene.

6. A method according to claim 1 in which the diluent is nitrobenzene.

HAROLD TALBOT LACEY.

CERTIFICATE OF CORRECTION.

Patent No. 2,302,612.  November 17, 1942.

HAROLD TALBOT LACEY.

It is hereby certified that error appears in the printed specification of the above numbered patent requiring correction as follows: Page 1, first column, line 23, beginning with "The most" strike out all to and including the serial number and period "287,273." in line 29; and that the said Letters Patent should be read with this correction therein that the same may conform to the record of the case in the Patent Office.

Signed and sealed this 5th day of January, A. D. 1943.

(Seal)
Henry Van Arsdale,
Acting Commissioner of Patents.